United States Patent [19]

Boisen et al.

[11] 3,797,635
[45] Mar. 19, 1974

[54] ACCUMULATOR TYPE SLAT CONVEYOR

[75] Inventors: Martin H. Boisen, Chula Vista; Steve Crevar, Jr., San Diego; Robert T. Morris, El Cajon, all of Calif.

[73] Assignee: Rohr Industries, Inc., Chula Vista, Calif.

[22] Filed: Aug. 30, 1972

[21] Appl. No.: 284,858

[52] U.S. Cl. .................................. 198/75, 104/165
[51] Int. Cl. ..................... B65g 37/00, B61b 13/00
[58] Field of Search ........ 198/39, 75; 104/165, 209, 104/75

[56] References Cited
UNITED STATES PATENTS
3,083,780  4/1963  Swenson ............................. 198/39
FOREIGN PATENTS OR APPLICATIONS
612,795  11/1948  Great Britain ..................... 104/165
405,388  7/1966  Switzerland ....................... 104/209

Primary Examiner—Richard E. Aegerter

[57] ABSTRACT

An accumulating conveyor comprises a plurality of load supporting slat units, each of a length proportioned to the shortest load to be handled on the conveyor. Each slat unit is provided with a clutch, which normally grips a drive belt to advance its respective slat unit along the accumulator conveyor. A retractable stop pin is mounted in the path of the clutches, and when extended engages the clutch of an approaching slat unit to free it from the drive belt. The stop pin is maintained in extended position by photo cell means activated by a light beam directed across the path of a load approaching on a feed conveyor. When the light beam is intercepted by an approaching load, it deactivates the photo cell and withdraws the stop pin, whereupon the clutch engages the drive belt and advances the slat unit to supporting position beneath the oncoming load. As long as the passing load continues to intercept the light beam, successive slat units continue to be advanced by their clutches to supporting position beneath the load. When the load passes the light beam, however, the latter again activates the photo cell, thereby extending the stop pin to clutch releasing position and arresting further feeding of slat units onto the accumulator conveyor until another load arrives in position to again intercept the light beam.

12 Claims, 6 Drawing Figures

ACCUMULATOR TYPE SLAT CONVEYOR

BACKGROUND OF THE INVENTION

Loads of widely varying size and weight frequently are required to be handled by a single conveyor, and at times it may be necessary to arrest the advance of the loads, so that the loads accumulate on the conveyor back of the line of arrest. When this occurs the loads frequently are pressed together by the advancing force of the moving conveyor, crushing some of the loads, causing over-riding or jack-knifing of others, and in general, creating an undesirable and sometimes costly situtation. Accumulating conveyors are commercially available, but some have limitations such as variation in load size, types and weight which they will handle successfully and other factors. It is desirable, therefore, to provide an accumulator conveyor which will handle loads of widely varying sizes, types and weight without causing successive loads to bear against, or even to touch each other.

PURPOSE OF THE INVENTION

A primary objective of the present invention is to provide a slat type accumulator conveyor which provides support of minimum length for small loads, and support of a length commensurate with the lengths of longer loads, and automatically relieves the driving force on any load coming into pressure driving engagement with a load in front of it on the conveyor.

Another objective of the invention is to provide a slat type accumulator conveyor comprising a plurality of separate, clutch controlled, photo cell actuated slat units, each slat unit being of a length to accept the shortest load which the accumulator conveyor is designed to handle. A photo cell controlled by a light beam, which is so located as to be intercepted by each load as it arrives at the entrance to the accumulator conveyor, thereby to actuate a clutch on a leading slat unit to cause said leading slat unit to advance to supporting position beneath the oncoming load. Successive slat units continue to be advanced beneath the load as long as the load continues to intercept the light beam. When the load passes beyond the light beam, the photo cell is again activated to halt further advance of the slat units. Thus each load is supported on a required number of slat units to extend the full length of the load. The clutch on each slat unit is also mounted in position to be released by pressure engagement with a slat unit ahead of it, so that no slat unit can be in substantial pressure, driving engagement with a slat unit ahead of it.

BRIEF DESCRIPTION OF THE DRAWINGS

The foregoing objectives and advantages of the invention will be apparent from the following description and the accompanying drawings, wherein.

DETAILED DESCRIPTION OF THE DRAWINGS

Figure 1:
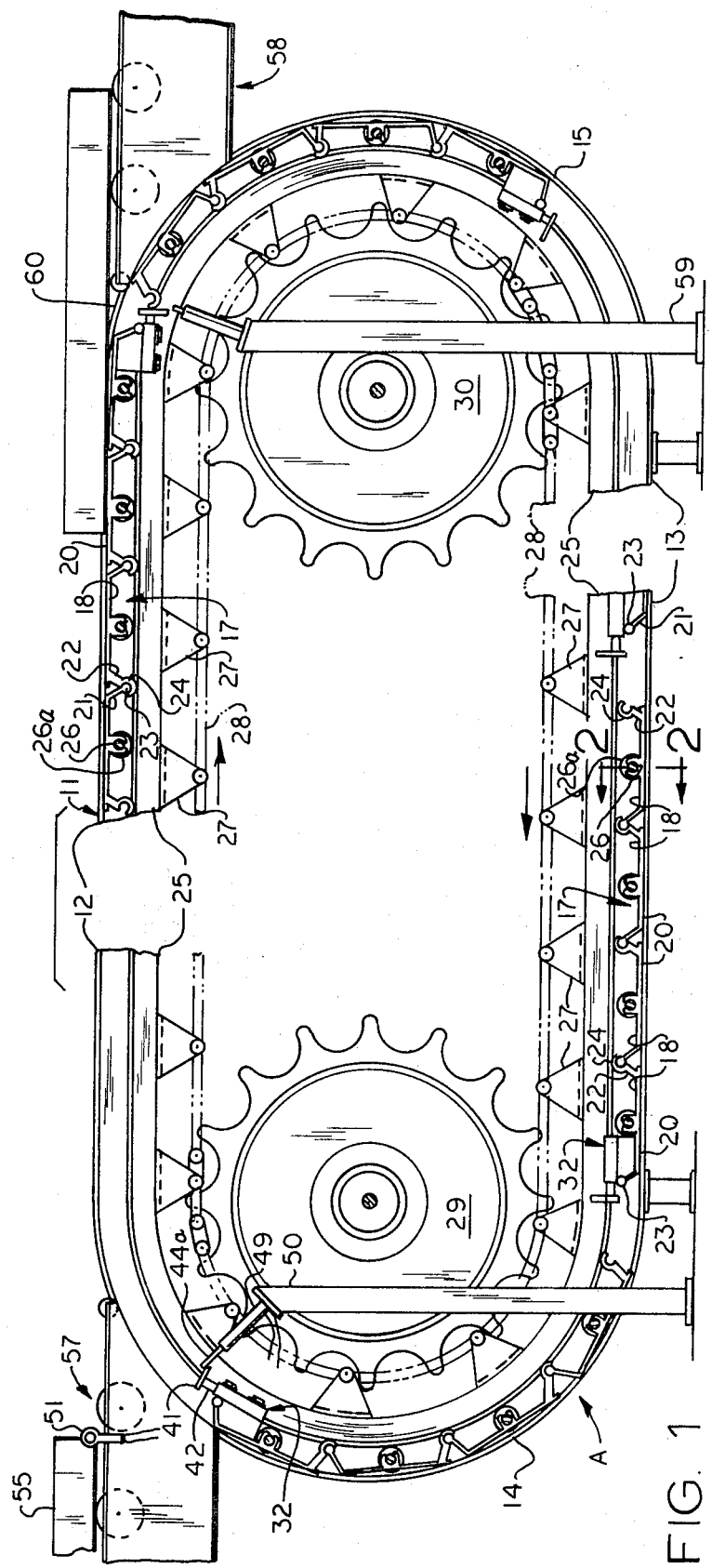
FIG. 1 is vertical, longitudinal, sectional view of an accumulator slat type conveyor embodying the invention, portions being broken away, and end fragments of feeder and takeoff conveyor with which the invention is used also being shown.
Figure 2:
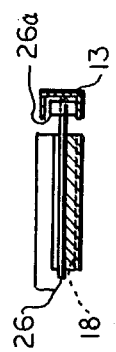
FIG. 2 is a fragmentary, sectional view taken along line 2—2 of FIG. 1.

Referring to the drawings in detail, a conveyor trackway A comprises a pair of generally similar channel tracks 10 and 11, with straight upper and return portions 12 and 13, see FIG. 1, and rounded end portions 14 and 15. The tracks are mounted in laterally opposite relation with the open sides of their respective channels facing inwardly. A plurality of conveyor slat units 17, each consisting of four interconnected slat elements 18, are mounted for roller supported movement about the trackway A. Each slat unit 17 is of a length proportionate to that of the shortest load to be conveyed.

Each slat element 18 may be an extrusion of suitable material, for example, aluminum, and comprising a flat, slat-like center portion 20 with inwardly sloping front and rear end portions 21 and 22, respectively. Each sloping front portion 21 has a bead 23 formed on the leading edge thereof, which is shaped and located to enter, and have hinged interlocking relation with, a channel 24 formed on the rear end of the rear portion 22 of the slat element ahead of it in the same four slat unit. However, the channel 24 in the rear slat element of each slat unit is left open, so as to freely receive and release the bead 23 on the leading slat element of the following slat unit. An axle 26 is mounted in an opening provided to receive it in the under side of each slat element, and a roller 26a is journaled on each end of the axle for rolling movement in the channel tracks.

Figure 3:
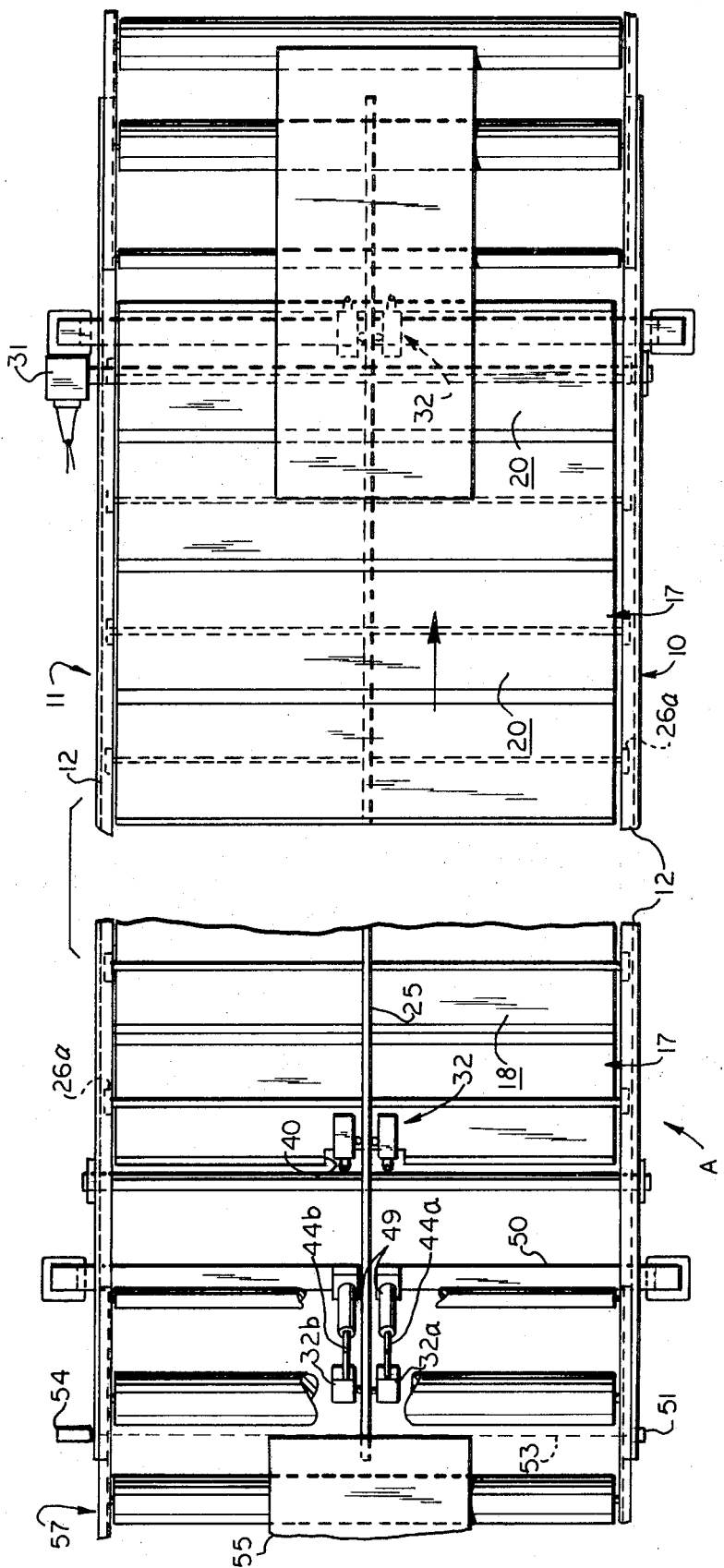
FIG. 3 is a top, plan view of FIG. 1, portions being broken away.
Figure 4:
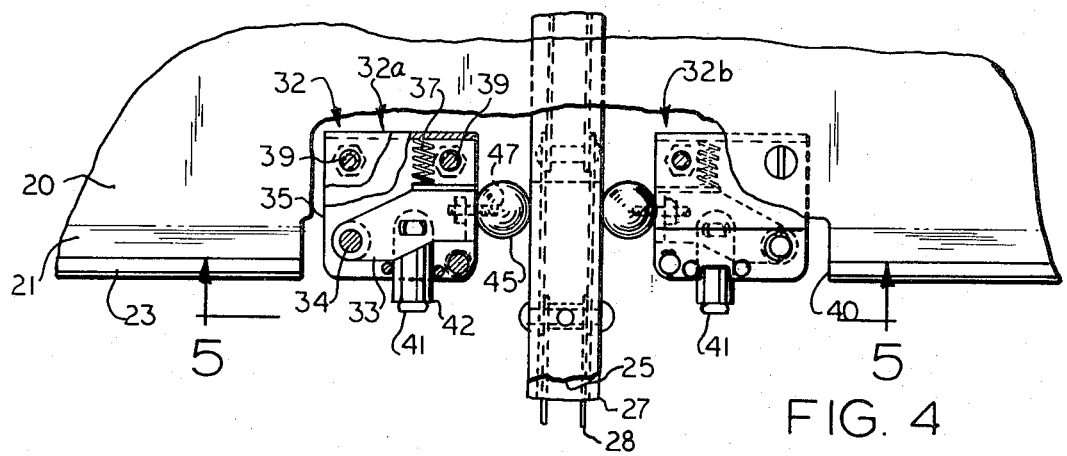
FIG. 4 is an enlarged, fragmentary, top, plan view showing a portion of a drive belt gripping clutch mounted beneath the leading slat element of its slat unit, portions being broken away.
Figure 5:
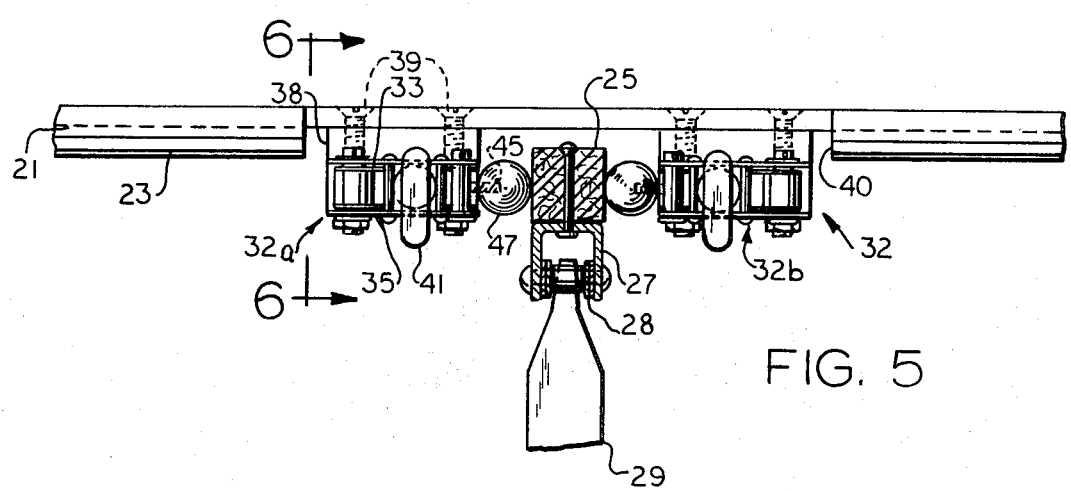
FIG. 5 is a sectional view taken along line 5—5 of FIG. 4, portions being broken away, a fragment of one of the sprockets being shown.

A drive belt 25 for clutch engagement with the slat units for propelling them in orbit around the generally oblong trackway A is of flexible or rubber belt type material, and of square cross sectional shape as best shown in FIGS. 4 and 5. The drive belt 25 is mounted by brackets 27 in outwardly spaced relation on a roller link drive chain 28, which is trained around two aligned, axially parallel sprockets 29 and 30, and is driven continuously during operation of the conveyor by conventional power drive means, such as a reduction gear motor 31, see FIG. 3.

A clutch 32 for clutch engagement with the square drive belt 25 is mounted on the leading slat element 18 of each slat unit 17. Each clutch 32 comprises an opposed pair of clutch elements, such as the illustrative pair 32a and 32b shown in detail in FIGS. 4 – 6. The clutch elements of each pair are similar, but reversed, so that only the clutch element 32a is described in detail.

The clutch element 32a comprises a clutch lever 33, pivotally mounted on a pivot post 34 fixedly secured in a housing 35 formed of heavy sheet metal, and biased by a coil compression spring 37 toward belt engaging position. The housing 35 is spaced from the under side of the slat body 18 by a spacer 38, and is secured to the housing by countersunk head bolts 39. The sloping front portion 21 of the slat element 18 is cut away, as shown at 40 in FIGS. 2 and 4–6, so as to expose a clutch releasing contact plate 41 mounted on the projecting forward end of a clutch-releasing plunger 42. The latter is mounted for fore-and-aft, axial, sliding movement between a pair of guide pins, see FIGS. 4 and 5, in the clutch housing 35.

The rear end of the plunger 42 bears against an intermediate portion of its associated clutch lever 33, and when the contact plate 41 engages either the rear channel 24 of the rear slat element of a slat unit 17 in front of it, or stop pin 44a to be described later herein, the plunger 42 is moved rearwardly, swinging the clutch lever 33 in a counterclockwise direction about its pivot post 34 against the biasing force to its clutch spring 37 as shown in FIG. 4, thereby releasing the clutch from clutch engagement with the drive belt 25. A ball clutch shoe 45 of suitable clutch material is fixedly mounted by a stud 47 on the free end of the clutch lever 33 for engaging the drive belt.

Figure 6:
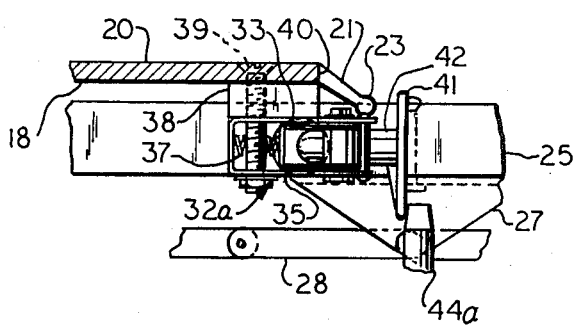
FIG. 6 is a sectional view taken long line 6—6 of FIG. 5, a fragment of a clutch releasing pin being shown.

A pair of the substantially identical clutch release stop pins 44a and 44b are mounted in the path of movement of the contact plates 41 of the clutch elements 32a and 32b, respectively, of each clutch 32 as the slat units 17 travel in orbit around the trackway A. Each stop pin is mounted for controlled, movement on a suitable base 49, mounted on a fixed standard 50. The base 49 may be, for example, a solenoid, or an air or hydraulic cylinder, and is under the control of a photo cell 51, see FIGS. 1 and 2, which, by means of conventional electrical, mechanical, hydraulic or other suitable mechanism, not shown, moves the stop pins between extended, clutch releasing position as shown in FIGS. 1, 3 and 6, and retracted position as shown by the stop pins 52 at the right hand side of FIG. 1, to be referred to later herein.

The photo cell 51 is operatively mounted to be activated by a light beam 53 directed thereto from a light source 54 across the path of any load 55 is excess of minimum height approaching the entrance end of the accumulator conveyor along a conventional feed conveyor 57. The stop pins 44a are controlled by conventional means, not shown, so that when the photo cell 51 is energized by the light ray 53, the stop pins are extended to engage the contact plates 41 of the clutch of an approaching slat unit 17 and thereby arrest the slat unit. When the light beam 53 is intercepted by an approaching load 55 on the feed conveyor 57, the photo cell 51 is de-energized, the stop pins 44 are retracted, and the clutch springs 37 swing the clutch balls 45 into engagement with the drive belt 25, thereby advancing the slat unit 17 into supporting position beneath the load 55 as the latter arrives at the entrance end 12 of the upper run of the accumulator conveyor. As the trailing end of the load 55 passes the light ray 53, the solenoid is again activated to extend the stop pins 44 to their normal, contact plate engaging position.

OPERATION

It is assumed that the accumulator conveyor is set up as shown in the drawings, together with conventional feed conveyor 57 and takeoff conveyor 58, and the drive motor 31 operating to drive the chain 28 and square drive belt 25 mounted thereon in the direction of the arrows. In the absence of a load approaching the entrance end of the upper run 12 of the trackway A, the light beam 53 activates the photo cell 51 and thereby maintains the stop pins 44a in their extended, contact plate engaging position. The contact plates 41 of the leading slat unit 17 passing upwardly around the curved end portion 14 of the trackway A engage these pins and are forced thereby to swing their respective clutch levers 33 to clutch releasing position. The contact plates 41 of succeeding slat units 17, approaching along the return run 13 engage, and are moved to clutch releasing position by engagement with the rear channels 24 of slat units in front of them.

A load 55 approaching the entrance end of the accumulator conveyor on the feed conveyor 57, the load intercepts the light beam 53, thereby deactivating the photo cell 51, whereby the stop pins 44a are retracted and the contact plates 41 are released to allow the clutch springs 37 to swing their levers 33 into clutch engagement with the moving drive belt 25. The distance from the leading end of a slat unit 17 arrested by the stop pins 44a to the entrance end of the conveying run of the accumulator conveyor is approximately the same as that from the light beam 53 to such entrance end, so that as the leading end of each load arrives at the entrance end of the accumulator conveyor, the leading end of the slat unit released by the interception of the light beam is moving along in supported position beneath it.

If the load 55 is of lesser length than the slat unit thus advanced beneath it, the trailing end of the load will pass beyond the light beam 53 and thus cause the stop pins 44a to be extended to clutch releasing position before the contact plates of the next succeeding slat unit arrive at the stop pins, thereby arresting such next slat unit until a successive approaching load causes another retraction of the stop pins.

However, in the event that the load is longer than such first slat unit advanced therebeneath, it continues the interception of the light beam 53 until the contact plates of the next successive slat unit have passed beyond the stop pins 44a, so that successive slat units will thus continue to be fed into position beneath the load as long as the light beam remains intercepted.

For controlling the exit of loaded slat units 17 from the takeoff end 69 of the upper run of the accumulator conveyor, the second pair of stop pins 52 are mounted on fixed standards 59 in position to engage the contact plates 41 of a leading slat unit and those behind it in the same manner as explained previously herein for the stop pins 44a. The stop pins 52 may be operated in accordance with the requirements of each installation, for example, at selected time intervals, or by manual, photo cell controlled, or computer controlled means. In any event, it will be necessary to maintain the stop pins 52 withdrawn until the clutches of all of the slat units supporting any one single load have passed, once the stop pins have been withdrawn to release a load for movement. This may be done, for example, by photo cell controlled means similar to those illustrated and described for the pins 44a, with the light beam for the photo cell mounted to be intercepted by the leading load just after the latter has been released for movement off of the accumulator conveyor. Since such controls may be readily provided by any ordinarily skilled engineer, designer or other worker conversant with the present invention, the details therefor are omitted.

In the event that a load is of such length that more than one slat unit 17 is provided in supporting position therebeneath, as each leading slat unit of such plurality tends to draw ahead, away from the slat unit behind it, the contact plates 41 of such following slat unit will be released thereby from relative rearward pressure by the channel 24 on the trailing end of the slat unit ahead of its, so that such following slat unit will thereupon be driven by clutch engagement with the belt 25.

The invention provides a simple and effective accumulator conveyor, capable of handling loads of widely varying size and weight without danger of jack-knifing, or of crushing or damaging smaller or more fragile loads, and of automatically advancing one or more slat units under the load as required to provide support substantially commensurate with the length of each load.

Having thus described the invention, what is claimed as new and desired to be protected by U. S. Letters Patent is:

1. In combination, a feed conveyor and an accumulator conveyor comprising,
   a closed loop vertical conveyor trackway,
   a plurality of separate conveyor units mounted for individually supported movement along the trackway, each conveyor unit being of a length to support and convey thereon a load of minimum specified length,
   drive means mounted to conform to said trackway,
   power means for driving the drive means along the trackway,
   clutch means mounted on each conveyor unit for releasable clutch engagement with the drive means for moving said each conveyor unit along the trackway, the clutch means of all conveyor units being located for movement along a common path,
   means biasing each clutch means toward clutch engagement with the drive means,
   stop means mounted adjacent a selected, fixed point along the path of movement of the clutch means, said stop means being movable selectively between extended position into the path of movement of the clutch means for releasing from the drive means clutch means coming in contact with the extended stop means, and retracted position beyond and clear of the path movement of the clutch means for releasing the clutch engagement with the drive means clutch means engaged by the stop pin, and
   means responsive to the presence of a load on said feed conveyor at a selected point of approach to the trackway, said load responsive means being operatively connected to the stop means for moving the stop means selectively between extended and retracted position.

2. An accumulator conveyor as claimed in claim 1 wherein the means responsive to the presence of a load retains the stop means in retracted position until the entire load passes such selected point of approach.

3. An accumulator conveyor as claimed in claim 1 wherein each clutch means is mounted on a forward portion of its respective conveyor unit and is positioned for pressure contact with the stop means and also with a rear portion of a conveyor unit immediately ahead thereof on the trackway, each clutch means being constructed and arranged for release from clutch engagement with the drive means upon the exertion on said forward portion of a relatively rearward force of known magnitude by such rear portion of a conveyor unit immediately ahead thereof.

4. An accumulator conveyor as claimed in claim 1 wherein second stop means is also provided, said second stop means being mounted adjacent to a second fixed position along the path of movement of the clutch means beyond that of the stop means defined in claim 1, said second stop means being movable between extended and retracted position similarly to the stop means defined in claim 1 for controlling movement of conveyor units past such second fixed point.

5. An accumulator conveyor as claimed in claim 1 wherein the power drive means comprises an elongated flexible member, each clutch means comprises a pair of jaw members mounted on opposite side of the drive member, and spring means urges the jaw members toward gripping, clutch engagement with the drive member.

6. An accumulator conveyor as claimed in claim 5 wherein the elongated flexible member is a rubber belt mounted on a plurality of brackets on a drive chain trained around a pair of sprockets, and the power drive means drives one of the sprockets.

7. An accumulator conveyor as claimed in claim 5 wherein a contact member extends forwardly from each jaw member for pressure contact with the rear end of a conveyor unit immediately ahead thereof, and with the stop means when the latter is in its extended position, each contact member being operatively mounted to move its respective jaw member free of clutch engagement with the drive member upon the exertion on said each contact member of a relatively rearward force of known magnitude.

8. An accumulator conveyor as claimed in claim 1 wherein the conveyor is of the slat type, and each conveyor unit comprises a plurality of hingedly interconnected slat elements.

9. An accumulator conveyor as claimed in claim 8 wherein each slat element comprises a flat central portion and front and rear sloping end portions, which end portions slope downwardly when their respective central portion is in substantially horizontal, load supporting position.

10. An accumulator conveyor as claimed in claim 9 wherein a bead is formed on the terminal edge of one sloping end portion of each slat element, and a groove is formed in the terminal edge of the other sloping end portion of each slat unit, and the adjacent sloping end portions of adjacent slat elements of each conveyor unit are hingedly interconnected to each other by inserting the bead on one of such adjacent sloping end portions into the groove in the other of said adjacent sloping end portions, each such groove being shaped to prevent withdrawal of such inserted bead therefrom in the direction of conveyor movement.

11. An accumulator conveyor as claimed in claim 1 wherein a feed conveyor is mounted to feed incoming loads onto a selected entrance portion of the trackway, and the means responsive to the presence of a load comprises a light ray aimed toward a light responsive element and positioned for interception of such light ray by the arrival of such load on the feed conveyor at such selected point of approach.

12. An accumulator conveyor as claimed in claim 11 wherein the stop means is located a known distance ahead of such entrance portion of the trackway relative to the direction of conveying movement, of the feed conveyor, and the distance of such selected point of approach from the entrance portion of the trackway is such that the leading end of each such load, and the leading end of a conveyor unit released in response to the presence of such load at such selected point of approach arrive substantially simultaneously at such entrance portion of the trackway.

* * * * *

UNITED STATES PATENT OFFICE

CERTIFICATE OF CORRECTION

Patent No. __3,797,635__  Dated __March 19, 1974__

Inventor(s) Martin H. Boisen; Steve Crevar, Jr.; and Robert T. Morris

It is certified that error appears in the above-identified patent and that said Letters Patent are hereby corrected as shown below:

Column 5, line 67, (Claim 4) delete "position" and insert --point--.

Signed and sealed this 10th day of September 1974.

(SEAL)
Attest:

McCOY M. GIBSON, JR.
Attesting Officer

C. MARSHALL DANN
Commissioner of Patents